US010906470B2

(12) United States Patent
Hernandez et al.

(10) Patent No.: US 10,906,470 B2
(45) Date of Patent: Feb. 2, 2021

(54) APPARATUS TO STORE A MOBILITY DEVICE IN A LIFT GATE OF A VEHICLE

(71) Applicant: Ford Global Technologies, LLC, Dearborn, MI (US)

(72) Inventors: Dante Jaime Hernandez, Tlalnepantla (MX); Alvaro Jimenez, Mexico City (MX); Alan Sampson, Mexico City (MX); David Angeles De La Cruz, Tlalnepantla de Baz (MX); Carlos Hernandez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 16/322,174

(22) PCT Filed: Aug. 3, 2016

(86) PCT No.: PCT/US2016/045356
§ 371 (c)(1),
(2) Date: Jan. 31, 2019

(87) PCT Pub. No.: WO2018/026363
PCT Pub. Date: Feb. 8, 2018

(65) Prior Publication Data
US 2019/0161017 A1    May 30, 2019

(51) Int. Cl.
B60R 7/00      (2006.01)
B60R 7/04      (2006.01)
B60R 11/00     (2006.01)
B60R 7/02      (2006.01)

(52) U.S. Cl.
CPC ............ B60R 7/046 (2013.01); B60R 7/02 (2013.01); B60R 11/00 (2013.01); B60R 2011/0021 (2013.01); B60R 2011/0036 (2013.01)

(58) Field of Classification Search
CPC ......... B60R 5/04; B60R 7/046; B60R 11/00; B60R 2011/0021; B60R 2011/0036; B60R 11/0003; B60R 2011/0057; B60R 2011/0059; B60R 2011/007;
(Continued)

(56) References Cited

U.S. PATENT DOCUMENTS 5,372,289 A * 12/1994 Dachicourt ............... B60R 7/02
                                                         224/281
7,204,537 B1   4/2007 Oh et al.
8,172,296 B2   5/2012 Umeda et al.
(Continued)

FOREIGN PATENT DOCUMENTS

CN    203692742     7/2014
CN    2014137225    2/2015
(Continued)

OTHER PUBLICATIONS

International Searching Authority, "Search Report and Written Opinion," issued in connection with International Patent Application No. PCT/US16/45356, dated Oct. 21, 2016, 29 pages.

Primary Examiner — Dennis H Pedder
(74) Attorney, Agent, or Firm — Hanley, Flight & Zimmerman, LLC

(57) ABSTRACT

Apparatus to store a mobility device in a lift gate of a vehicle are described herein. An example apparatus includes a lift gate of a vehicle and a mobility device coupled to an interior of the lift gate.

20 Claims, 8 Drawing Sheets

(58) Field of Classification Search
CPC ....... B60R 2011/0071; B60R 2011/008; B60R 2011/0085
USPC ......... 296/56, 206, 146.8, 37.1, 37.8, 37.18, 296/37.13, 37.16; 248/206.5
See application file for complete search history.

(56) References Cited

U.S. PATENT DOCUMENTS

| | | | |
|---|---|---|---|
| 8,540,197 B1 * | 9/2013 | Krol, II | A63C 17/0006 |
| | | | 211/DIG. 1 |
| 10,245,936 B2 * | 4/2019 | Gillett | B62K 21/26 |
| 2006/0177282 A1 | 8/2006 | Blosser | |
| 2009/0224567 A1 | 9/2009 | Tohda et al. | |
| 2012/0205413 A1 | 8/2012 | Degenstein et al. | |
| 2014/0326525 A1 * | 11/2014 | Doerksen | A63C 17/12 |
| | | | 180/181 |

FOREIGN PATENT DOCUMENTS

| | | |
|---|---|---|
| CN | 204223101 | 3/2015 |
| DE | 10005960 | 2/2000 |
| DE | 102007051325 | 5/2009 |
| DE | 102014018111 | 12/2014 |
| WO | 2012048882 | 4/2012 |
| WO | 2013072306 | 5/2013 |
| WO | 2018026363 | 2/2018 |

* cited by examiner

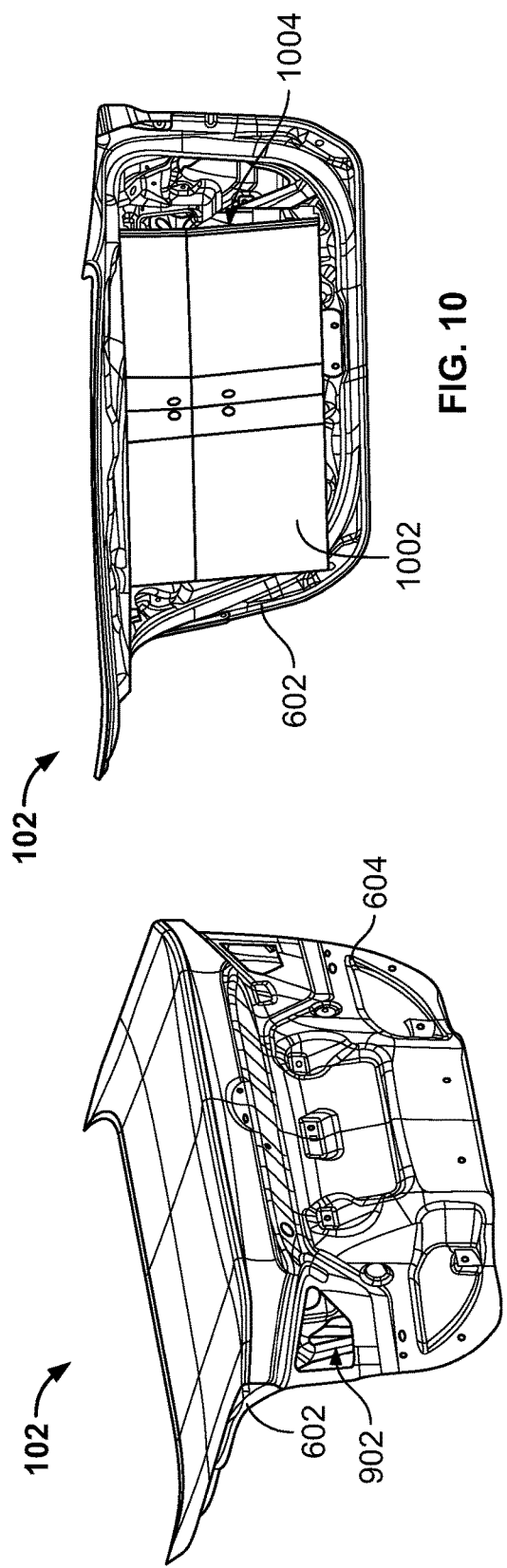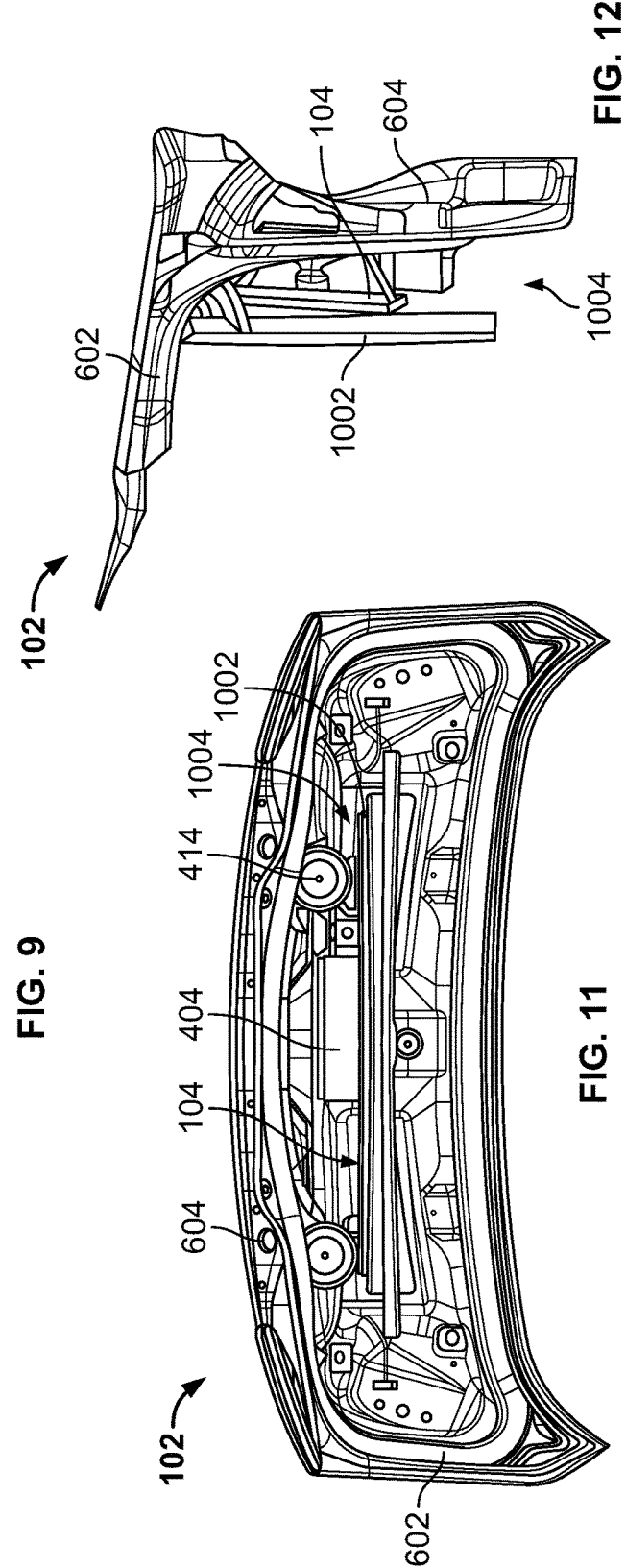

US 10,906,470 B2

1

APPARATUS TO STORE A MOBILITY DEVICE IN A LIFT GATE OF A VEHICLE

This disclosure relates generally to lift gates and, more particularly, to an apparatus to store a mobility device in a lift gate of a vehicle.

BACKGROUND

People around the world are migrating to urban environments, making it especially difficult for commuters, urban residents, elderly or disabled people, and tourists to move around. Existing infrastructure is limited and urban environments will be challenged by an increasing number of vehicles. Thus, last mile devices (e.g., scooters, longboards, skate boards, etc.) may be an important factor in improving mobility in urban environments.

SUMMARY

An example apparatus includes a lift gate of a vehicle and a mobility device coupled to an interior of the lift gate.

Another example apparatus includes a lift gate of a vehicle and a compartment integrated in the lift gate to store a mobility device.

BRIEF DESCRIPTION OF THE DRAWINGS

FIGS. 9-14 depict an example implementation of the lift gate and the example mobility device coupled to the lift gate.

The figures are not to scale. Wherever possible, the same reference numbers will be used throughout the drawing(s) and accompanying written description to refer to the same or like parts.

DETAILED DESCRIPTION

Figure 1:
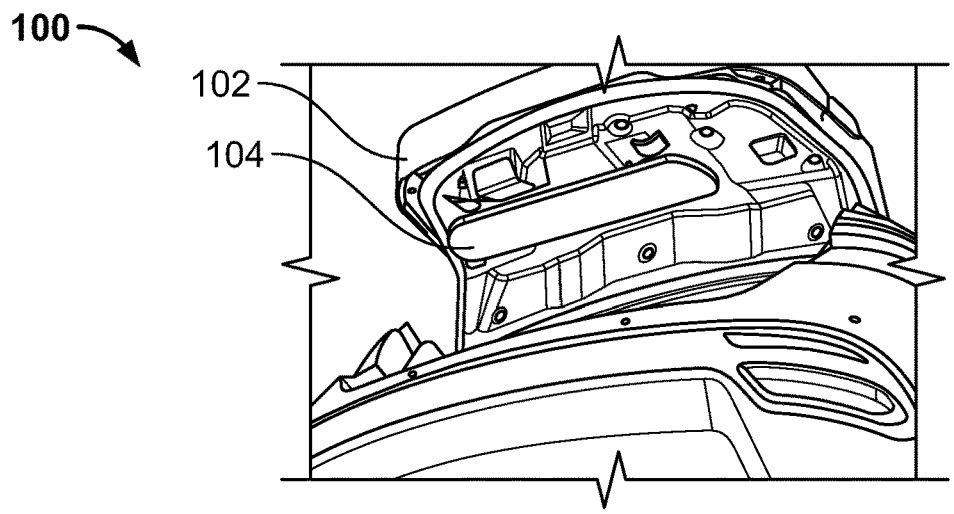
FIGS. 1-3 represent example vehicles within which an example trunk lid or lift gate and an example mobility device may be implemented.

Popularity of longboards in the mobility device market is increasing because longboards give a rider the freedom to go wherever they want. Longboards may be used not only in the city, but also in areas with multiple types of terrain. Wheels on the longboard may be made from urethane and may be larger than, for example, wheels of skateboards. For this reason, longboards are able to traverse cracks, bumps, rocks and other obstacles in the path of the longboard. Some longboards may include electric motors, enabling the rider to use the longboard to travel to work without significant physical exertion. However, electric longboards require recharging and, thus, may not be charged and ready to use when a rider would like to use the longboard.

A mobility device (e.g., an electric longboard) that may be stored and charged in a trunk or storage area of a vehicle is described herein. The example mobility device may be attached to an interior surface of a lift gate (e.g., a trunk lid) of the vehicle. The mobility device is attached to the lift gate such that the mobility device does not interfere with or significantly reduce the storage capacity of the trunk or storage area. For example, the mobility device may be stored within a compartment of the lift gate formed by the trim of the lift gate. The trim of the lift gate may be altered to accommodate the addition of the mobility device to the lift gate. Thus, the storage capacity of the trunk is not significantly reduced by adding a mobility device to the lift gate.

An example attachment device to maintain the position of the mobility device within the lift gate compartment includes straps to secure the mobility device to the lift gate. Alternatively, the lift gate may include a built-in shelf, which can move between a storage or stowed position and a released or open position. In the storage position, the shelf becomes part of the trim of the lift gate and, thus, is part of the compartment for the mobility device. When the shelf is in the released position, the user is able to access the mobility device. The example shelf may also include an attachment device to secure the mobility device to the shelf. For example, the shelf may include straps or magnets to maintain a position of the mobility device on the shelf. In some examples, the mobility device may be coupled to the lift gate by one or more magnets operative to maintain the mobility device within the compartment of the lift gate.

The mobility device may include an electric motor to assist the user of the mobility device and reduce the amount of physical effort required to travel using the mobility device. The electric motor may be useful to an employee commuting to work that does not want to be physically exhausted prior to arriving at their place of work. The electric motor may be powered by a battery attached to the mobility device. The battery can be charged when the mobility device is stored in the compartment of the lift gate. For example, when the rider places the mobility device in the lift gate compartment, the mobility device may be automatically connected to a source of power such that the rider or operator does not need to plug in the mobility device. For example, the compartment may include a built-in docking system that recognizes when the mobility device is inserted into the compartment. In particular, the docking system and compartment only enable the mobility device to be inserted in the compartment in a specific way such that the mobility device will charge without further involvement by the user. In some examples, the mobility device may be charged using a cable or other electrical connection. Alternatively, the mobility device may be charged using wireless (e.g., inductive) charging when inserted into the compartment.

The example battery of the example mobility device may be charged using a second battery of the vehicle. For example, the vehicle battery may be the same battery used for the other electric components of the car, or may be a separate battery that may be charged using the kinetic energy generated by the motion of the car (e.g., via regenerative breaking).

In some examples, the mobility device is controlled using a remote control. The remote control may be a separate device associated with the mobility device, or may be the user's smartphone. The smartphone may be operative to use a designated application to enable the user to control the mobility device via the smartphone. For example, a FordPass application may be operative to control the mobility device. In some examples, the remote control or smartphone are operative to control the speed and direction of the mobility device. Alternatively, the speed and/or direction may be controlled using more conventional means, such as the user's foot or body placement (e.g., lean left or right to turn, push off to accelerate, drag a foot to decelerate, etc.).

In some examples, the mobility device may be communicatively coupled to the vehicle. For example, the vehicle may include a status light or icon indicating the charge status of the mobility device. For example, if the mobility device has no charge, the indicator may be red, if the mobility device is charging, the indicator may be yellow, and if the mobility device is fully charged, the indicator may be green. A similar indicator may also be placed on the mobility device to provide an indication to the rider if the battery has a low charge. The mobility device may also be operative to communicate with the vehicle to alert the vehicle when the mobility device is adjacent to the vehicle. In some such examples, the vehicle may automatically unlock or open the trunk to enable the driver/rider to more easily access the compartment in the lift gate to place the mobility device in the compartment. Similarly, the vehicle may automatically lock if the mobility device travels outside of a certain range and there is not a driver in the vehicle to prevent the driver/rider from leaving the vehicle unlocked while using the mobility device.

Figure 2:
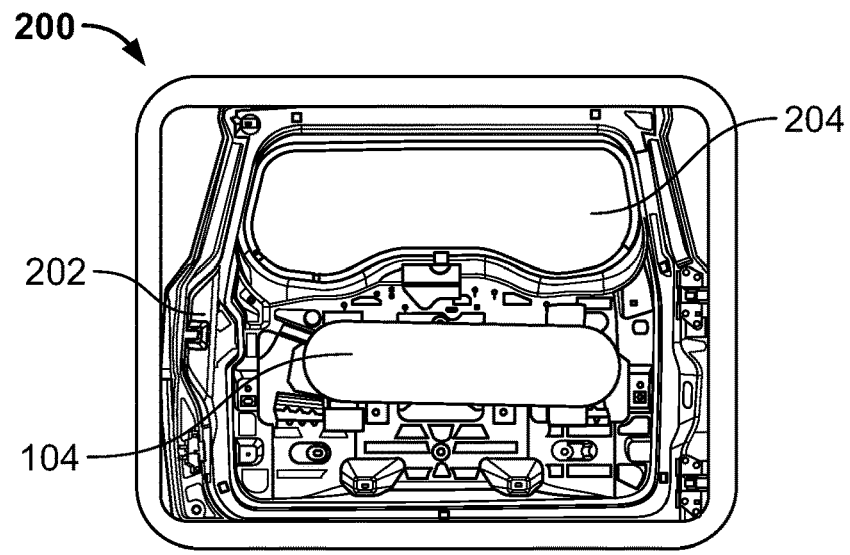
Figure 3:
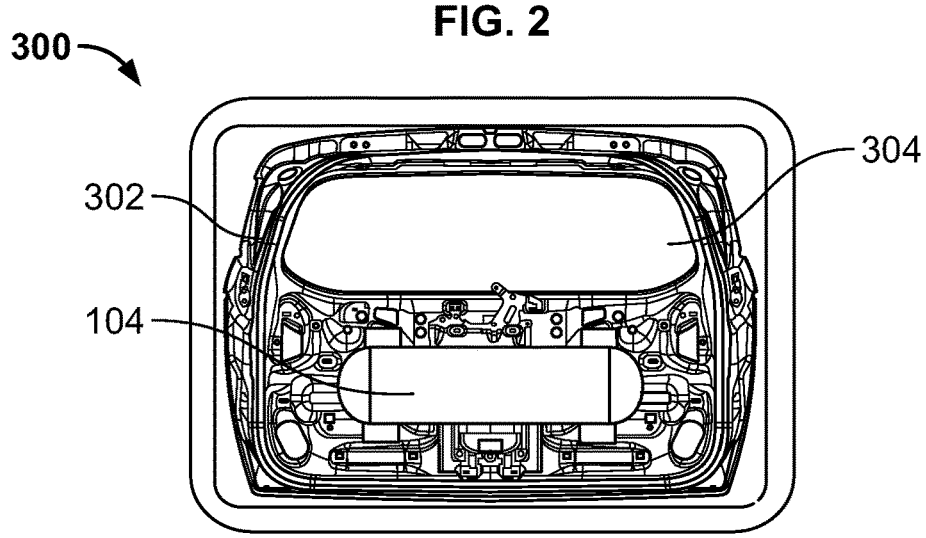

FIGS. 1-3 represent example first, second, and third vehicles 100, 200, 300 within which an example trunk lid or lift gate 102, 202, 302 and an example mobility device (e.g., a longboard 104) may be implemented. As shown, the example longboard 104 is attached to the lift gates 102, 202, 302 of the different types of vehicles 100, 200, 300. In FIG. 1, the example longboard 104 is attached to a trunk lid or lift gate 102 of a sedan or coupe style vehicle (e.g., the first vehicle) 100. In FIG. 2, the example longboard 104 is attached to a lift gate 202 of a minivan, van, or SUV style vehicle (e.g., the second vehicle) 200. In FIG. 3, the example longboard 104 is attached to a lift gate 302 of a hatchback style vehicle (e.g., the third vehicle) 300. Each style or type of lift gate 102, 202, 302 involves different modifications of the lift gate 102, 202, 302 to enable the longboard 104 to be attached to the lift gate 102, 202, 302. For example, the shape of the lift gate 102 of the first vehicle 100 in FIG. 1 is significantly different than the shape of the lift gates 202, 302 of the second and third vehicles 200, 300 in FIGS. 2 and 3. Additionally, an area under a window 204 (e.g., the area in which the mobility device 104 may be attached) of the lift gate 202 of the second vehicle 200 in FIG. 2 is larger than a corresponding area under a window 304 of the lift gate 302 of the third vehicle 300 in FIG. 3. Thus, the shape and/or size of a trim (e.g., the trim 602 in FIG. 6) adjacent to the longboard 104 and attached to each of the lift gates 102, 202, 302 may vary accordingly. It should be understood that any reference to the first vehicle 100 or the first lift gate 102 in the following description may be read to include any of the vehicles 100, 200, 300 or any of the lift gates 102, 202, 302.

Figure 4:
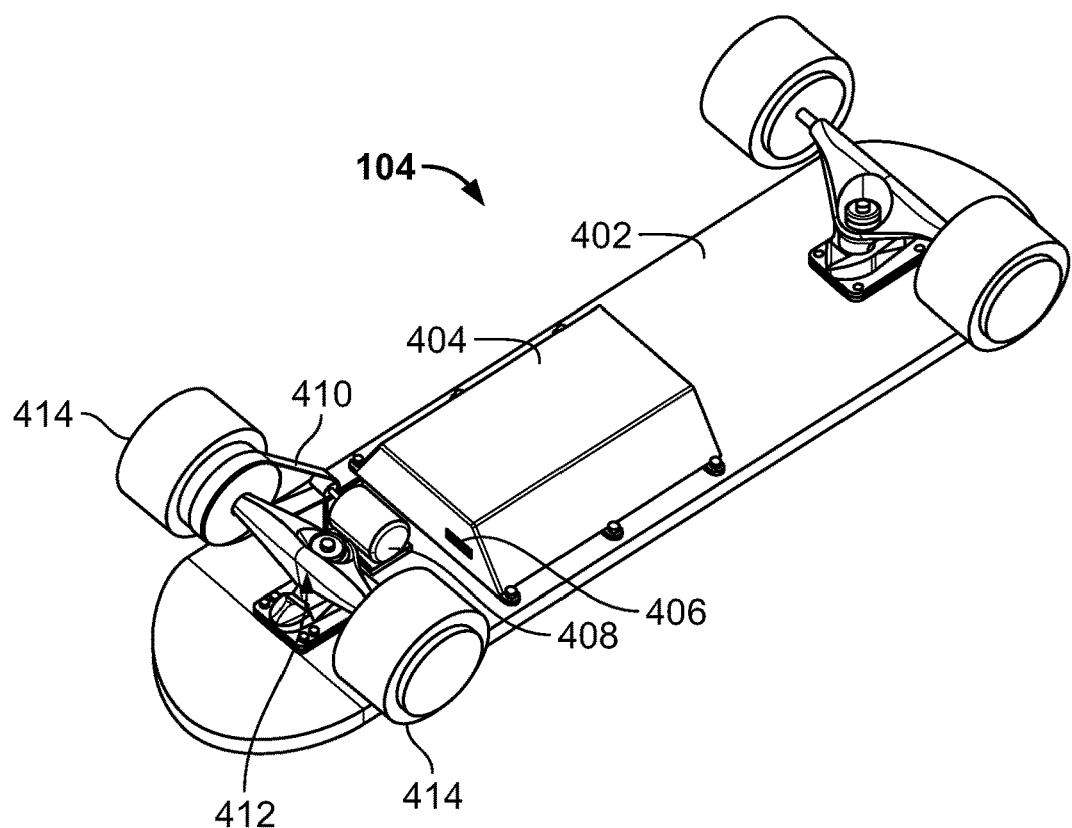
FIG. 4 depicts an example mobility device that may be used in conjunction with the examples described herein.

FIG. 4 depicts the example longboard 104 that may be used in conjunction with the examples described herein. FIG. 4 shows the underside 402 of the example longboard 104. While the depicted mobility device is a longboard, other types of mobility devices may be used with the examples described herein. For example, the mobility device may alternatively be a skateboard, a scooter, etc. The example longboard 104 includes a battery compartment 404, which may house a battery and any other electronic components (e.g., a processor) used to operate the longboard 104. For example, the battery compartment 404 may also include a communication interface to communicate with the vehicle 100 and/or a remote control device. The longboard 104 may be operative to communicate with the vehicle 100 via, for example, Bluetooth, FordSync, etc. In some examples, the longboard 104 may communicate a charge status to the vehicle 100. In such examples, an indicator light may be included on a dashboard of the vehicle 100 and may change colors based on the charge status of the longboard 104 (e.g., red indicates no charge or low charge, yellow indicates charging, green indicates full charge). Additionally, the vehicle 100 may be operative to detect the proximity of the longboard 104. In such examples, the vehicle 100 may lock and/or unlock the vehicle 100 or automatically open the lift gate 102 based on the proximity of the longboard 104 to the vehicle 100.

The battery compartment 404 also includes a port 406 to enable the user to charge the longboard 104. In some examples, the port 406 may be coupled to a dock within the compartment of the lift gate 102 to charge the longboard 104 via a battery of the vehicle 100. Alternatively, the user may charge the longboard 104 via a cable inserted into the port 406. The cable may be in a compartment of the lift gate 102 or may be connected to a wall outlet (e.g., the user may charge the mobility device in a home or office environment). In examples where the longboard 104 may be charged using wireless charging in the lift gate compartment, the battery compartment 404 may still include the port 406 to enable the user to charge the longboard 104 using a wall outlet. Alternatively, the longboard 104 does not include the port 406. In some examples, a driver of the vehicle 100 can manually turn on and off the charger for the longboard 104 using, for example, a button or switch located adjacent to the dashboard of the vehicle 100. Alternatively, the longboard 104 is automatically charged when the vehicle 100 is operated.

The longboard 104 also includes an electric motor 408 powered by the battery in the battery compartment 404 to propel the longboard 104. The electric motor 408 operates a belt 410, which causes an axle 412 of the longboard 104 to rotate, thus moving wheels 414 of the longboard 104. The motor 408 may have multiple speeds or settings so that the rider can adjust the speed of travel when using the longboard 104.

Figure 5:
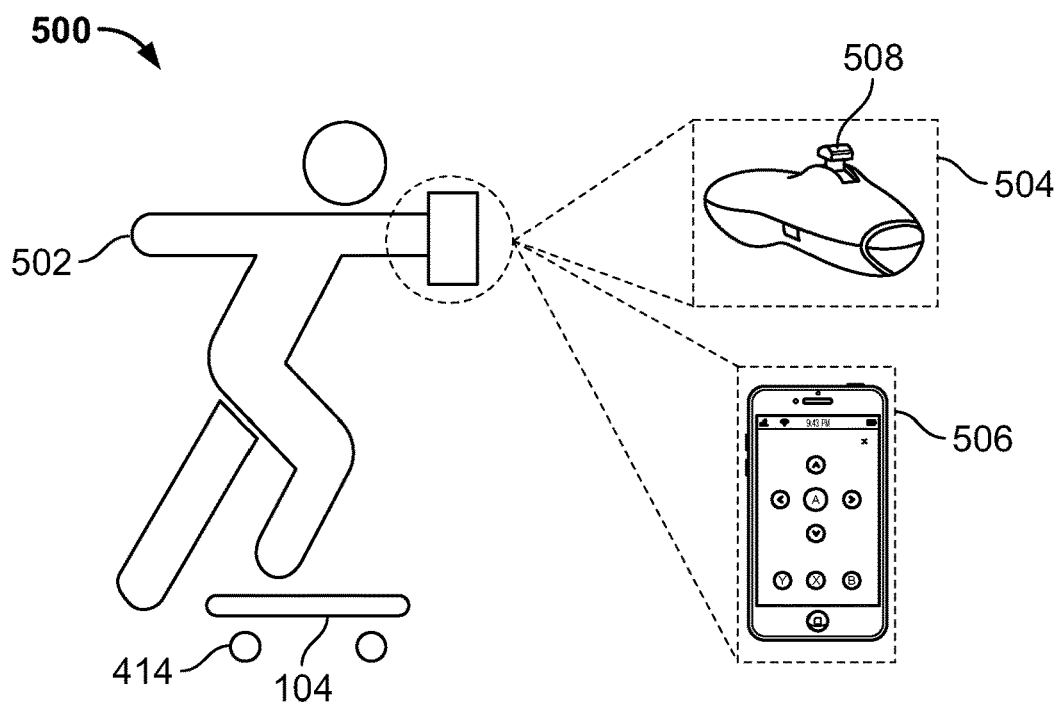
FIG. 5 depicts an example environment in which the example mobility device may be used.

FIG. 5 depicts an example environment 500 in which the example longboard 104 may be used. An example rider 502 may use the longboard 104 to commute to or from a work place, or may use the longboard 104 for recreational activities. The example rider 502 may control the longboard 104 using a remote control 504 or smartphone 506. The remote control 504 may include buttons and/or a joystick 508 to enable the rider 502 to steer the longboard 104 and control (e.g., accelerate, decelerate) the speed of the longboard 104. The smartphone 506 may be operative to control the longboard 104 using an application installed on the smartphone 506 (e.g., a FordPass application, Bluetooth, etc.). Alternatively, the rider 502 may control the direction of travel by leaning to turn and may control the speed of the example longboard 104 by using a foot to push off (e.g., accelerate) or drag a foot (e.g., decelerate). Thus, in such examples, the motor 406 may assist the rider 502 such that the physical exertion of the rider 502 when operating the longboard 104 is low or the motor 406 may be in a neutral state to enable the rider 502 to use the longboard 104 without assistance from the motor 406.

Figure 6:
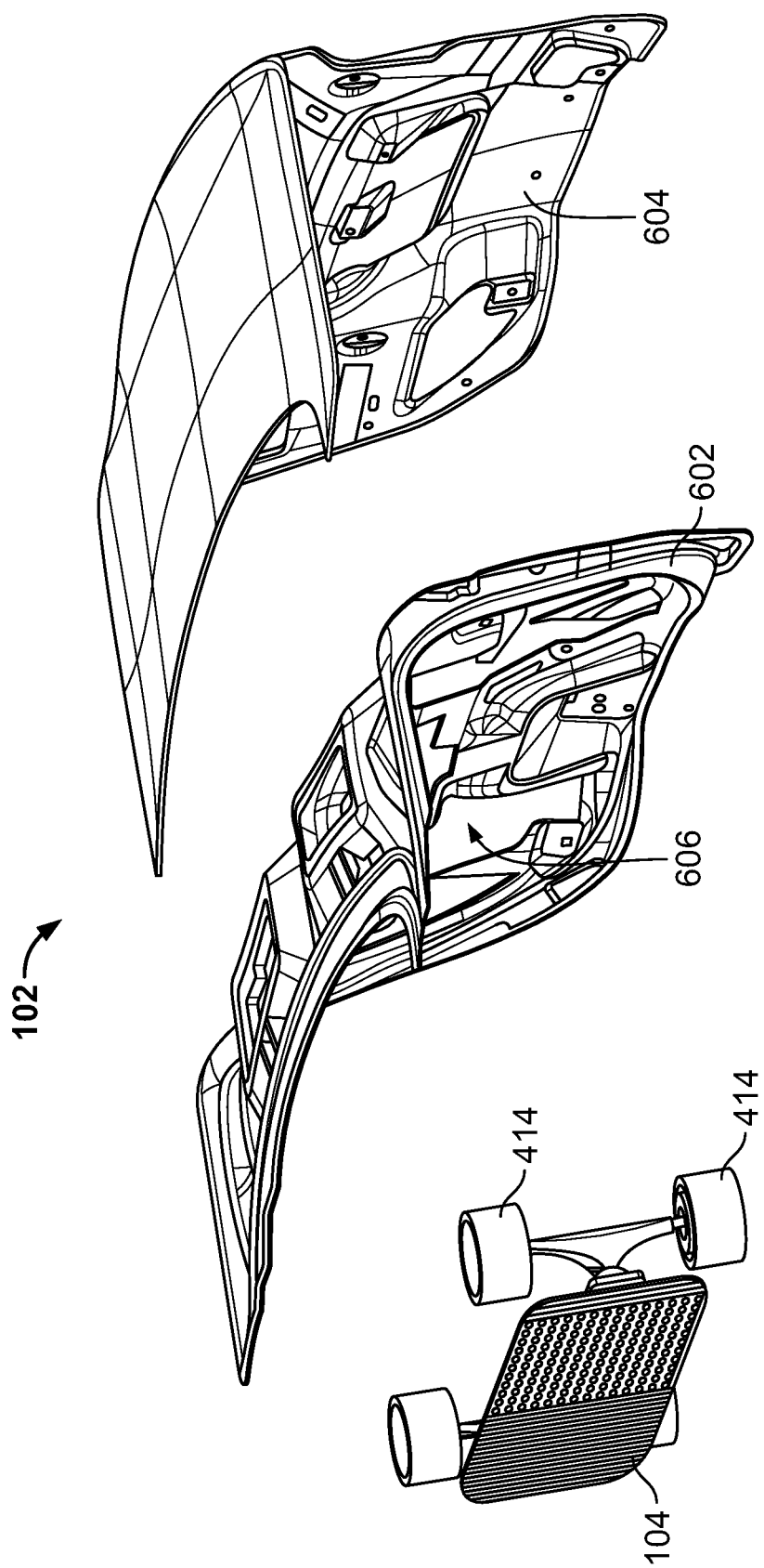
FIG. 6 is an exploded view depicting an assembly of the longboard, trim, and sheet metal of the lift gate.

FIG. 6 is an exploded view depicting an assembly of the longboard 104, trim 602, and sheet metal 604 (e.g., an outer panel) of the lift gate 102. In the illustrated example, the wheels 414 of the longboard 104 are disposed in apertures 606 of the trim 602 of the lift gate 102. The trim 602 is coupled to the sheet metal 604 and shaped to fit over any contours, indents, and protrusions of the sheet metal 604. The sheet metal 604 forms the exterior surface of the lift gate 102 and may contain components including tail lights, a release latch for the lift gate 102, etc. In some examples, the trim 602 may include components to implement other parts of the lift gate 102 (e.g., wiring for tail lights, components for the latch of the lift gate 102, sensors, etc.).

Figure 7:
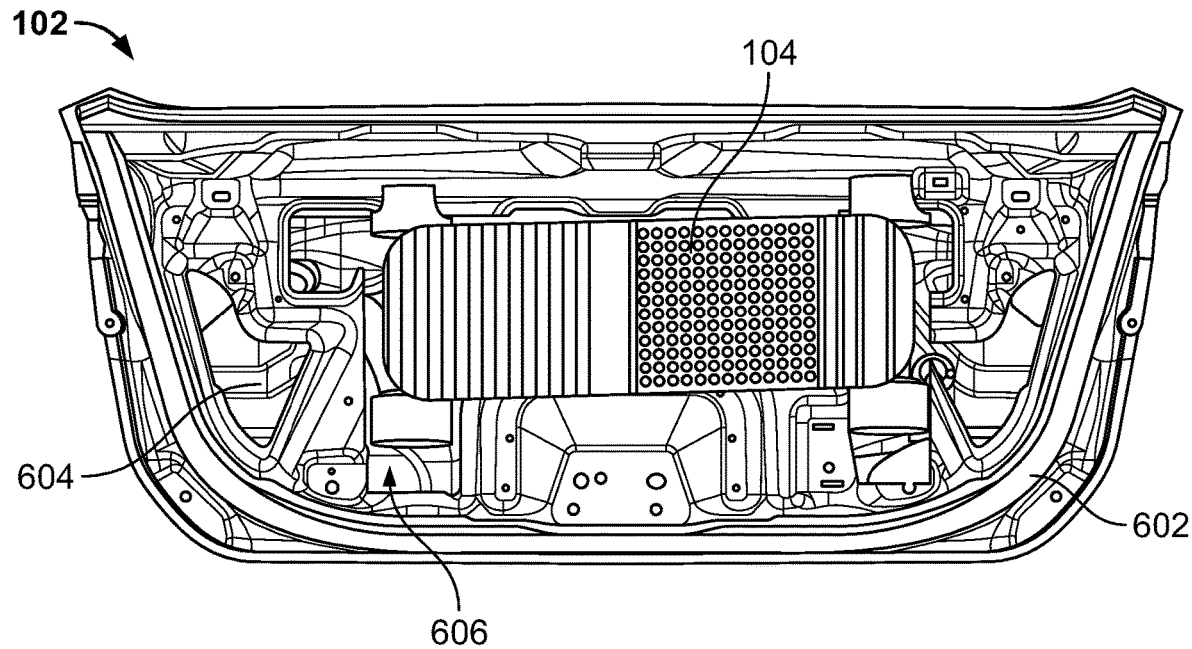
FIGS. 7-8 depict an example trim of the lift gate that may be modified to attach the mobility device to the lift gate.
Figure 8:
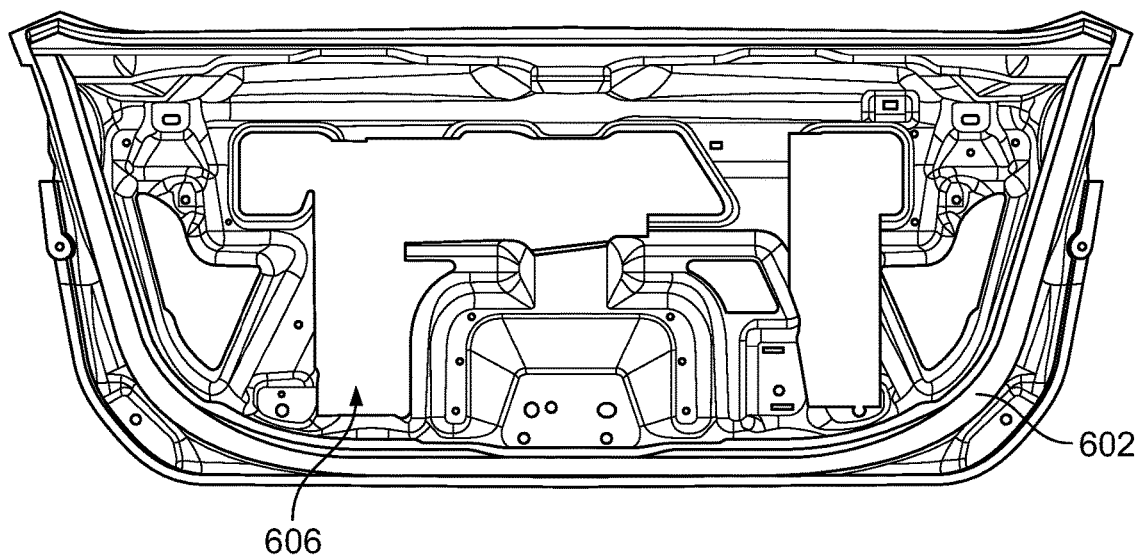

FIGS. 7-8 depict an example trim 602 of the lift gate 102 which may be modified to attach the longboard 104 to the lift gate 102. FIG. 7 depicts how an example longboard 104 fits within the trim 602 of the vehicle. The sheet metal 604 is visible through the apertures 606 of the trim 602 in FIG. 7. In this example, the trim 602 was modified to accommodate the wheels 414 of the example longboard 104. FIG. 8 depicts the modified trim 602 of the example lift gate 102.

FIGS. 9-14 depict an example implementation of the lift gate 102 and the example longboard 104 coupled to the lift gate 102. FIG. 9 depicts a rear exterior view of the example lift gate 102 of example vehicle 100. The lift gate 102 is to be coupled to a sedan or coupe style vehicle 100. The lift gate 102 is oriented in a position in which the lift gate 102 is closed. As shown in FIG. 9, the sheet metal 604 forms the exterior surface of the lift gate 102. The trim 602 is visible through apertures 902 in the sheet metal 604 in which tail lights may be disposed.

FIG. 10 depicts an interior view of the example lift gate 102. The lift gate 102 is oriented in a closed position. The example longboard 104 is coupled to an interior of the lift gate 102 via a shelf 1002 coupled to the trim 602 of the lift gate 102. The shelf 1002 is operative to couple the longboard 104 or other mobility device to the lift gate 102. The example shelf 1002 is designed to minimize the trunk space occupied by the longboard 102 and shelf 1002. The example shelf 1002 and the trim 602 define a compartment 1004 in which the longboard 104 may be disposed during operation of the vehicle 100. The example shelf and/or trim 602 may include a charger (e.g., charge center 1704 of FIG. 14) to enable the longboard 104 to be charged during operation of the vehicle 100. The example charger may include a cable that is plugged into the port 406 of the longboard 104 by a user, a wireless charging system, and/or a charging dock on which the longboard 104 may be placed when the longboard is stored in the compartment 1004. The charger is operatively coupled to a battery (e.g., vehicle battery 1702 of FIG. 14) of the vehicle 100 and may be configured to charge the longboard 104 only when the vehicle is operated.

FIG. 11 depicts an alternative view of the lift gate 102. In FIG. 11, the lift gate 102 is oriented in an open position. As shown in FIG. 11, the shelf 1002 and longboard 104 are coupled to an upper portion of the lift gate 102 when the lift gate 102 is in the open position. The longboard 104 fits between the shelf 1002 and the trim 602 and sheet metal 604 used to form the lift gate 102. FIG. 12 is a side view of the lift gate 102. FIG. 12 shows the position of the shelf 1002 and longboard 104 relative to the trim 602 and sheet metal 604.

Figure 13:
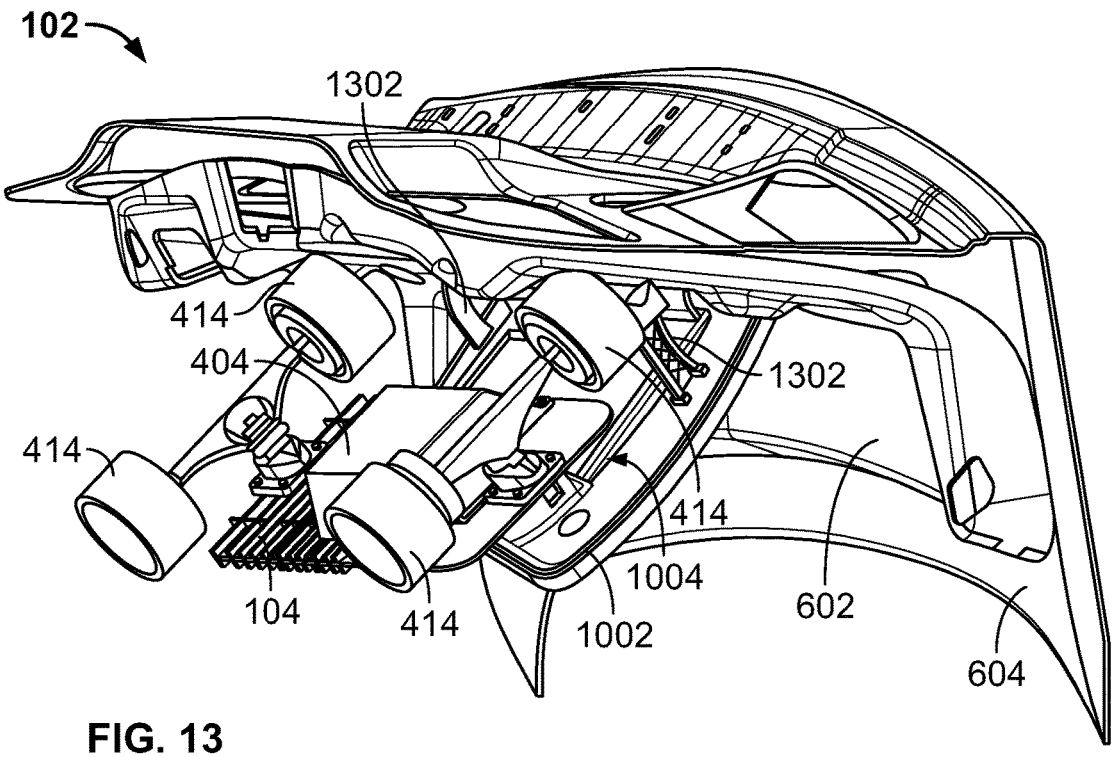
Figure 14:
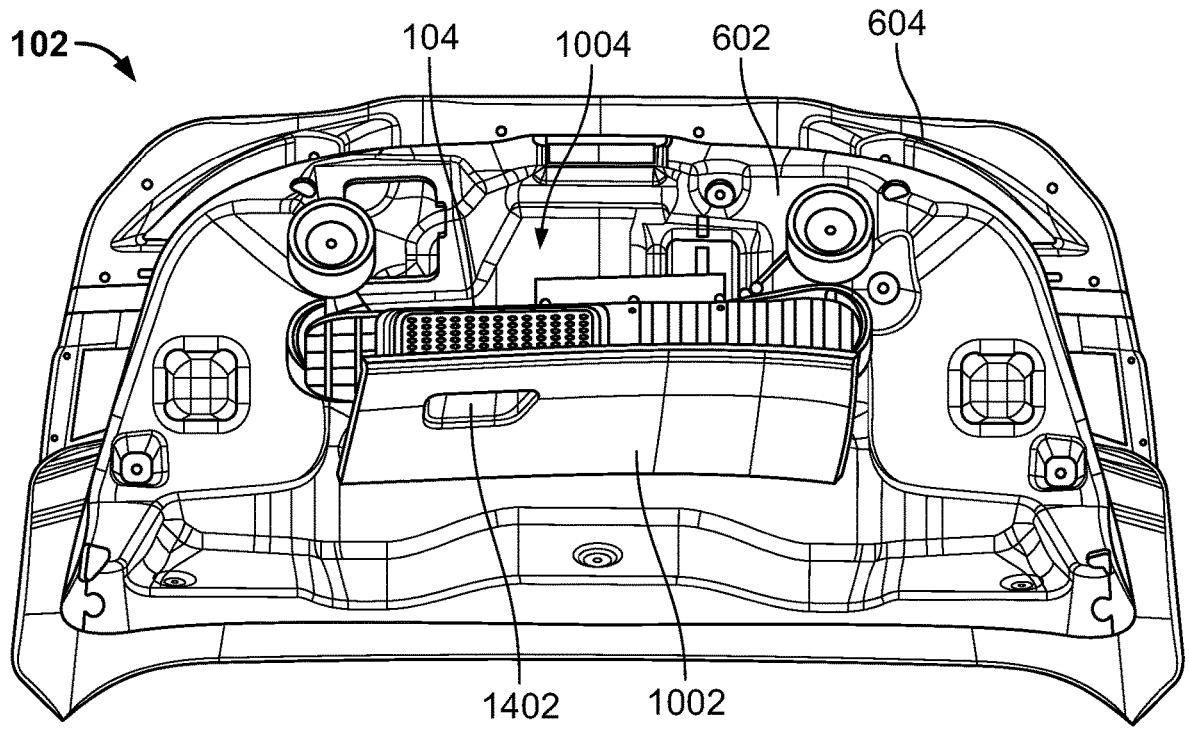

FIGS. 13 and 14 depict the example shelf 1002 in an open position and the example longboard 104 being removed from the compartment 1004 created by the shelf 1002 and the lift gate 102. As shown in FIG. 13, the example lift gate 102 includes hooks 1302 that may act as a hinge to enable the shelf 1002 to be moved from the open position to the closed position. FIG. 14 is an alternative view of the shelf 1002 in an open position and depicts a latch 1402 (e.g., a fastener) that may be used to release the shelf 1002 to enable the shelf 1002 to be moved to the open position. The latch 1402 may also secure or lock the shelf 1002 in a closed position. The shelf 1002 may be moved from the closed position to the open position in a manner similar to opening a glovebox.

Figure 15:
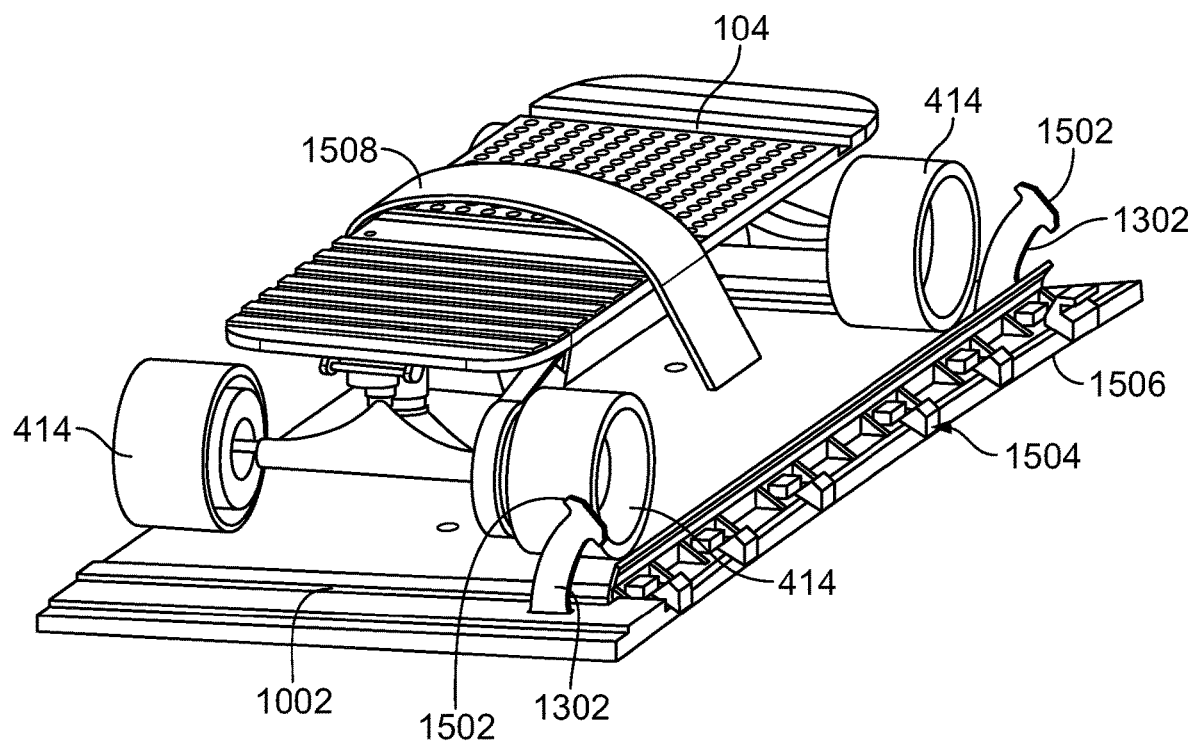
FIG. 15 depicts an example shelf that may be used to attach a mobility device to the lift gate and/or may form the compartment for the mobility device within the lift gate.

FIG. 15 depicts the example shelf 1002 in more detail that may be used to attach a longboard 104 to the lift gate 102 and/or may form the compartment 1004 for the longboard 104 within the lift gate 102. The illustrated example shelf 1002 is movable between the closed (e.g., stowed) position and the open (e.g., released) position. When in the open position, a larger portion 1502 of the hooks 1302 may anchor the shelf 1002 to the trim 602. Additionally or alternatively, an additional hinge 1504 may be used along an edge 1506 of the shelf 1002 adjacent to the hooks 1302 and coupled to the lift gate 102. The hinge 1504 may further facilitate movement of the shelf 1002 between the closed and open positions. In some examples, one or more straps 1508 may be used to further secure the longboard 104 when in the compartment 1004 formed by the shelf 1002. In some examples, the longboard 104 may be coupled to the shelf 1002 via the strap(s) 1508. Alternatively, the longboard 104 is coupled to the trim 602 via the strap(s) 1508. In some examples, the longboard 104 may be coupled to one of the shelf 1002 or trim 602 via magnets disposed on both the longboard 104 and the shelf 1002 or trim 602.

Figure 16:
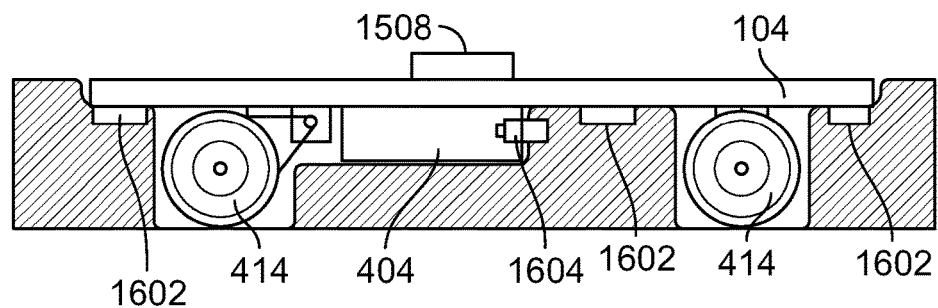
FIG. 16 depicts a cross-sectional view of the example mobility device coupled to the example lift gate.

FIG. 16 depicts a cross-sectional view of the example longboard 104 coupled to the example lift gate 102. In FIG. 16, the strap 1508 couples the example longboard 104 to the lift gate 102 rather than the shelf 1002. Additionally or alternatively, the longboard 104 may be coupled to the lift gate 102 using magnets 1062. A charging connection 1604 may be included to charge the longboard 104 when the mobility device 104 is coupled to the lift gate 102. The charging connection 1604 may be a wired connection (e.g., a cable, a charging dock), or a wireless contact point for wireless charging.

Figure 17:
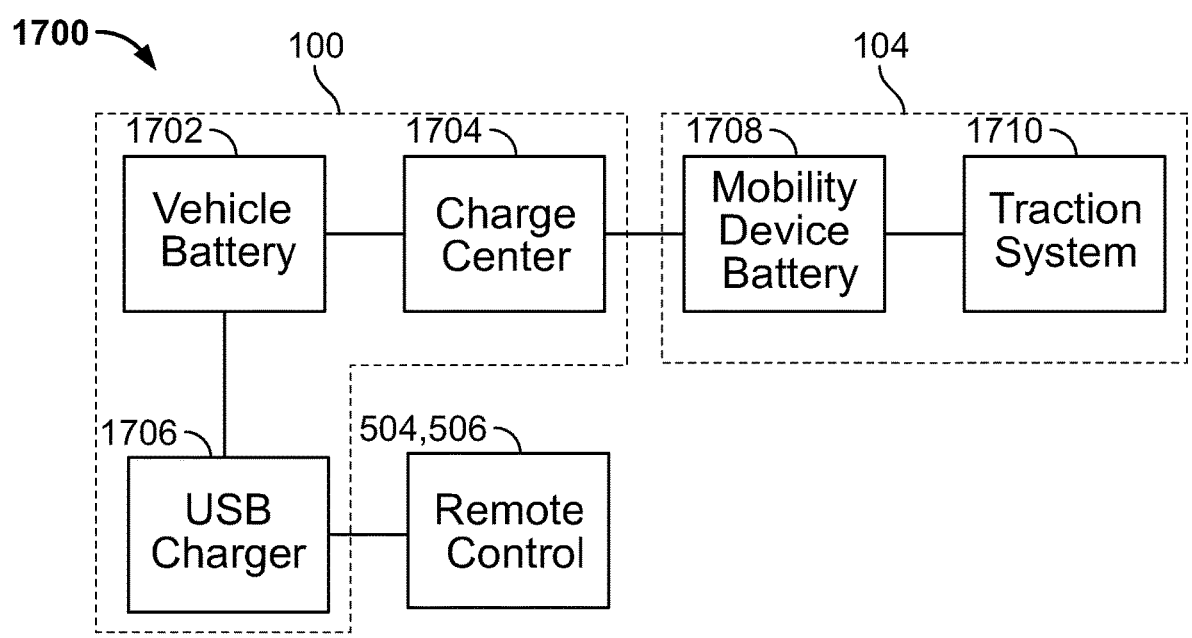
FIG. 17 depicts a block diagram that may be used in conjunction with the apparatus described herein to charge and/or control the example mobility device.

FIG. 17 depicts a block diagram of a system 1700 that may be used in conjunction with the apparatus described herein to charge and/or control the longboard 104. The example vehicle 100 may include a vehicle battery 1702, a charge center 1704 (e.g., the charging system), and a USB charger 1706 or other charging device for small electronics. As shown in FIG. 17, the example charge center 1704 may be located within the lift gate 102 of the vehicle 100 and used charge a battery 1708 of the example longboard 104. The charge center 1704 may be coupled to the vehicle battery 1702 via a charging cable. The example longboard 104 may then use the energy stored in the battery 1708 of the longboard 104 to control a traction system 1710 (e.g., the electric motor 408 and belt 410). The example IP charger 1706 may be operative to charge the example remote control 504 or smartphone 506 that may be used to control the example longboard 104. The IP charger 1706 may be disposed in the interior passenger portion of the vehicle 100.

From the foregoing, it will be appreciated that the above disclosed apparatus can be used to store and charge a mobility device within a lift gate of a vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a lift gate of a vehicle, the lift gate including a trim and an outer panel, the trim coupled to the outer panel, the trim including apertures; and
   a mobility device coupled to an interior of the lift gate, a portion of the mobility device to be positioned within the apertures of the trim.

2. The apparatus of claim 1 further including a strap coupled to the lift gate to secure the mobility device to the lift gate.

3. The apparatus of claim 1 further including a shelf coupled to the lift gate to secure the mobility device to the lift gate, the shelf moveable between a stowed position and a released position.

4. The apparatus of claim 3, wherein the shelf includes a fastener to lock the shelf in the stowed position.

5. The apparatus of claim 1 further including a magnet to couple the mobility device to the lift gate.

6. The apparatus of claim 1, wherein the mobility device includes an electric motor to propel the mobility device.

7. The apparatus of claim 1, wherein the mobility device further includes a first battery to be charged using a second battery of the vehicle.

8. The apparatus of claim 7 further including a charging dock, wherein the first battery is coupled to the charging dock via a charging cable.

9. The apparatus of claim 1 further including a remote control device to control the movement of the mobility device.

10. The apparatus of claim 9, wherein the remote control device is a smartphone operable to control the mobility device via an application on the smartphone.

11. An apparatus comprising:
    a lift gate of a vehicle, the lift gate including a trim, the trim including apertures; and
    a compartment integrated in the lift gate to store a mobility device, the compartment defined by a shelf and the trim, a portion of the mobility device to be positioned within the apertures of the trim.

12. The apparatus of claim 11 further comprising a charging dock within the compartment, the charging dock to charge the mobility device.

13. The apparatus of claim 11, wherein the compartment is partially formed by the trim of the lift gate.

14. The apparatus of claim 11, wherein the shelf is coupled to the lift gate, the shelf movable between a first position and a second position, the shelf, when in the first position, to form the compartment.

15. The apparatus of claim 11, wherein the compartment is partially formed by an outer panel of the lift gate.

16. The apparatus of claim 11 further comprising a strap coupled to the lift gate to secure the mobility device within the compartment.

17. An apparatus comprising means for storing means for mobility, the means for storing disposed on an inner surface of a lift gate of a vehicle, the means for storing including means for charging the means for mobility, the means for storing including a hook positioned on an end of the means for storing.

18. The apparatus of claim 17 further comprising means for accessing the means for mobility, the means for accessing integrated with the means for storing.

19. The apparatus of claim 3, wherein shelf includes hooks adapted to act as a hinge to secure the mobility device to the lift gate.

20. The apparatus of claim 19, wherein a first hook is coupled to the shelf at a first end and a second hook is coupled to the shelf at a second end.

* * * * *